United States Patent [19]
Stelniceanu

[11] 3,774,931
[45] Nov. 27, 1973

[54] PUSH-CART HAVING METALLIC WIRE FRAME

[75] Inventor: Jacques Dominique Stelniceanu, Arlington, Va.

[73] Assignee: The Firm of Dock & Dock, Arlington, Va. ; a part interest

[22] Filed: Dec. 17, 1971

[21] Appl. No.: 209,105

[52] U.S. Cl. .......................... 280/47.24, 280/DIG. 3
[51] Int. Cl. ................................................ B62b 1/10
[58] Field of Search .................. 280/47.24, 47.26, 280/DIG. 3, DIG. 4

[56] References Cited
UNITED STATES PATENTS

| | | | |
|---|---|---|---|
| 3,046,034 | 7/1962 | Herrick | 280/47.24 X |
| 2,372,372 | 3/1945 | Faure | 280/DIG. 3 |
| 1,635,423 | 7/1927 | Lapham | 280/DIG. 3 |
| 2,208,347 | 7/1940 | Stuart | 280/47.26 X |
| 2,868,557 | 1/1959 | Klipp et al. | 280/DIG. 3 |

FOREIGN PATENTS OR APPLICATIONS

| | | | |
|---|---|---|---|
| 1,094,470 | 8/1954 | France | 280/47.24 |
| 1,139,105 | 4/1957 | France | 280/DIG. 3 |
| 1,396,873 | 3/1965 | France | 280/47.24 |
| 934,243 | 8/1963 | Great Britain | 280/47.24 |

*Primary Examiner*—Benjamin Hersh
*Assistant Examiner*—John A. Pekar

[57] ABSTRACT

This invention relates to a push-cart and carrying device formed of metallic wire and suited for optional travel on wheels or for carrying by means of either of two handles (for selective height of the cart above the ground), and having a removable bag fitted within the frame and held in position on said frame by strap means. When the bag is in place, small articles may be safely transported in it, and when it is removed, the frame provides an area suited for lodging and transporting a box or case of such size as to be disposed on the base of the frame and within the side arms thereof. A pair of wheels, disposed inwardly from the sides of the frame, provide easy travel of the cart, and braking and support means when the cart is stopped are provided by a portion of the frame which is forwardly and downwardly disposed so that the outermost area thereof rests upon the ground. The lower of two hand-grips affixed upon the frame is used when carrying the device, and the upper of said hand-grips rests against the arm, supporting the device in such position as to prevent its impeding the walking of the person carrying it.

8 Claims, 9 Drawing Figures

INVENTOR
J. D. STELNICEANU

INVENTOR
J. D. STELNICEANU

PUSH-CART HAVING METALLIC WIRE FRAME

This invention relates to an article for the transporting of small, relatively light items, said article being optionally movable on wheels after the fashion of a push-cart, or carried by hand.

Many types of carts have been proposed, offering the feature of easy transportation of items gathered as during a shopping trip. Most, however, present the difficulty of being only wheelable, and not suited for carrying by hand by reason of their awkward design. Even among the wheelable carts, the wheels are normally disposed outwardly of the frame and tend to catch on door frames, impeding progress and risking distortion of the frame or detachment of a wheel.

The present invention overcomes the first of these disadvantages by providing a hand-grip on each of two frame members, said hand-grips being disposed one above the other, a distance apart, to permit lifting and carrying of the device a desired distance above the ground, as when stepping on or off a bus or in going up or down a flight of stairs. The lower of said hand-grips is preferably used for this purpose, and the upper, together with the frame to which it is affixed, rests against the arm of the person carrying it, providing sufficient leverage to maintain the wheels and the base of the device a comfortable distance from the person's legs, so as not to impede walking but to allow freedom of step.

The second disadvantage of presently available push-carts, that is, the placement of the wheels outwardly of the frame, is overcome in the present invention by mounting the wheels on a length of tubing into which, at opposite ends thereof, there are inserted the tips of one of the frame members. Thus the wheels, being placed inside the frame, are protected from obstructions along the path of the cart, and the axle on which they are mounted reacts with the end members of the frame to maintain the wheels firmly in alignment. Rotation of the wheels upon the axle is facilitated by the use of bearings formed of a frictionless or low-friction material such, for example, as teflon.

The frame may be employed independently as a baggage carrier, whereby a piece of luggage is disposed upon the base of the frame and rests between the side members of the frame and the guiding handle, and against the rear portions thereof.

Alternatively, a bag may be emplaced on the frame, the base of the bag resting on the floor of the frame and the upper part of the bag being retained in upright position by a strap member fitted over the uppermost, or guiding handle, portion of the frame. For purposes of protection of its contents, the bag may be provided with an overlapping cover, integral with one side of the bag, so that the contents are covered even when the bag is filled.

A third possible method of using this device is to place a piece of luggage, or a box or carton, on the frame and either carry the bag or suspend it on the opposite side of the frame, that is, the rear, so that the weight of its contents is supported on the wheels as the cart is pushed or pulled by the user.

For a better understanding of this invention, reference is made to the accompanying drawings, in which like parts bear the same numbers in all views, and in which FIG. 1 is a perspective view of the frame of this device;

Figure 2:
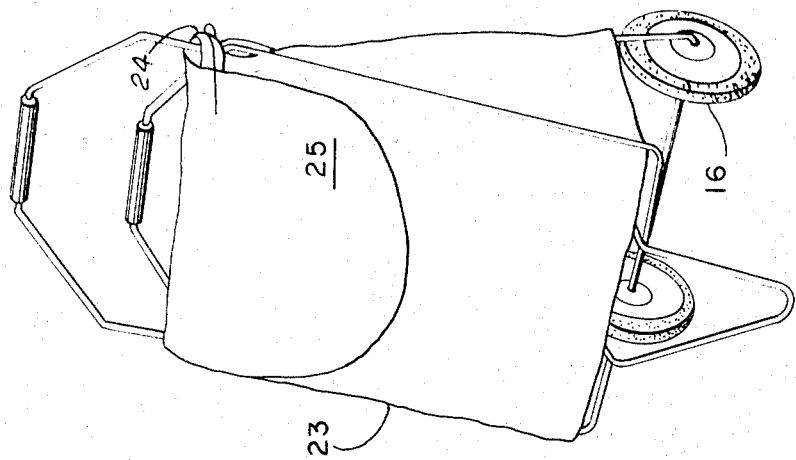
FIG. 2 is the same view, but with the bag emplaced on the frame.
Figure 1:
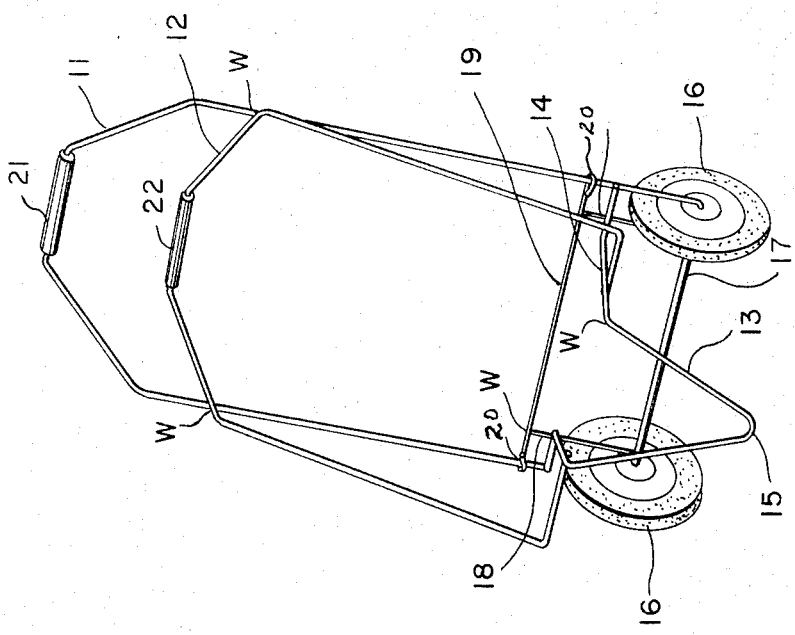

Referring more particularly to the drawings,

The view of the frame in FIG. 1 shows guiding handle portion 11, carrying cross-piece and side member 12, and base member 13, wherein bars 14, 14 form the floor of the cart and V-portion 15 serves as a brake and support for the cart when the same is left standing upright. Wheels 16, 16 are mounted on axle 17, which is integrally connected by members 18, 18 to transverse anchoring bar 19, the ends 20, 20 of which are secured around the side bars of member 11. Hand-grip 21 on member 11, and hand-grip 22 on the carrying cross-piece of member 12 provide for easier guidance and carrying of the device.

The bag 23 has a flat bottom, substantially rectangular so as to be accommodated on the bars 14, 14 forming the floor of the cart, and strap 24 which extends across the back of the bag to encompass the wire forming the upper part of guiding handle portion 11. The strap rests upon the juncture of the guiding handle 11 and carrying member 21 where the same are, preferably, connected by welding. Cover 25 folds forward a sufficient distance to provide closure of the bag even when the same is full.

Other juncture points where the parts of the frame are connected are indicated by the letter w.

Figure 8:
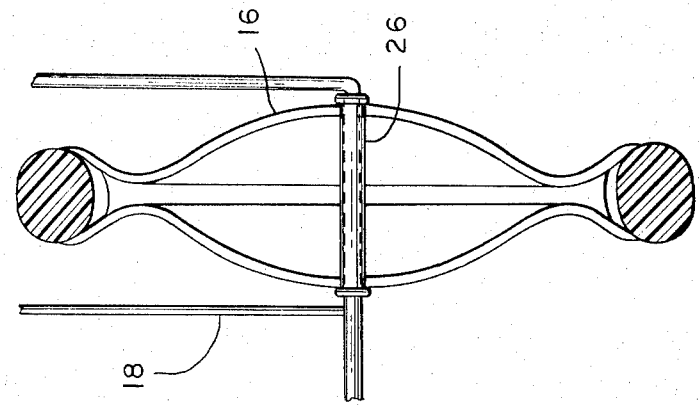
FIG. 8 is a detail of a wheel assembled on the axle between the upright anchoring bar attached to the axle, and the side bar forming a part of the guiding handle portion.

In the detail view of FIG. 8 there is shown the bearing 26 which permits easy turning of the wheel 16 without wear on either the wheel or the axle.

Figure 9:
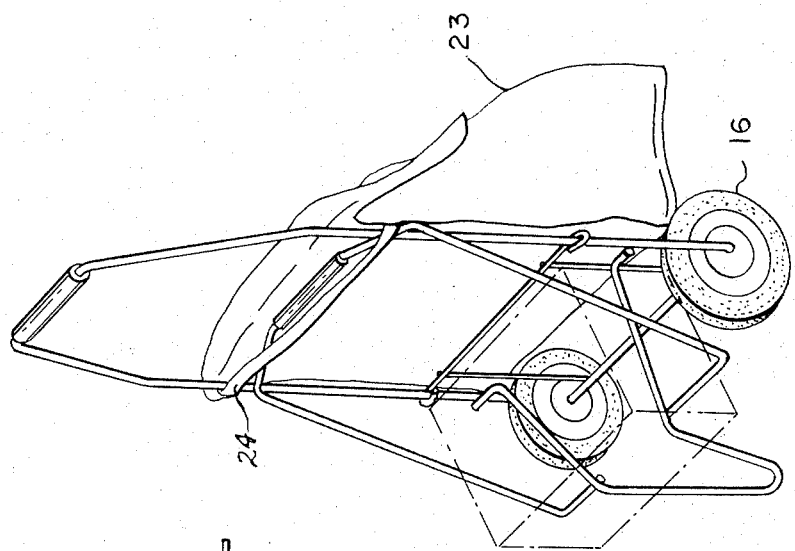
FIG. 9 shows the frame used to carry luggage or a box or carton while the bag is suspended upon the rear thereof.
Figure 7:
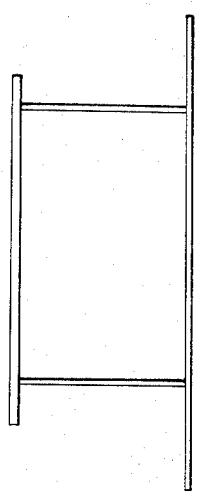
FIG. 7 is a top plan of the supporting axle and anchoring bars which hold the axle in assembly with the frame.
Figure 5:
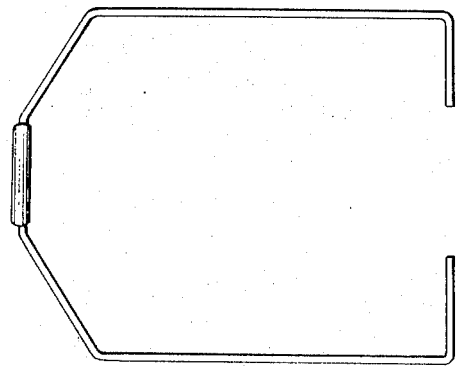
FIG. 5 is a top plan of the carrying cross-piece and side member portion having the carrying hand-grip affixed thereto.
Figure 6:
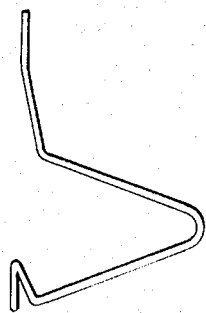
FIG. 6 is a perspective view of the base portion forming the floor of the cart and the brake member thereof.
Figure 4:
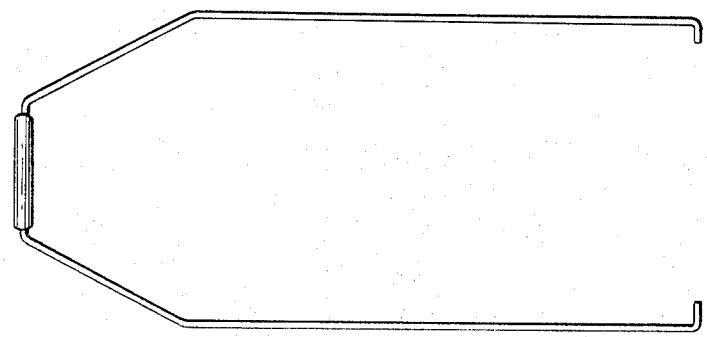
FIG. 4 is a top plan view of the guiding handle portion of the frame having the hand-grip affixed thereto.
Figure 3:
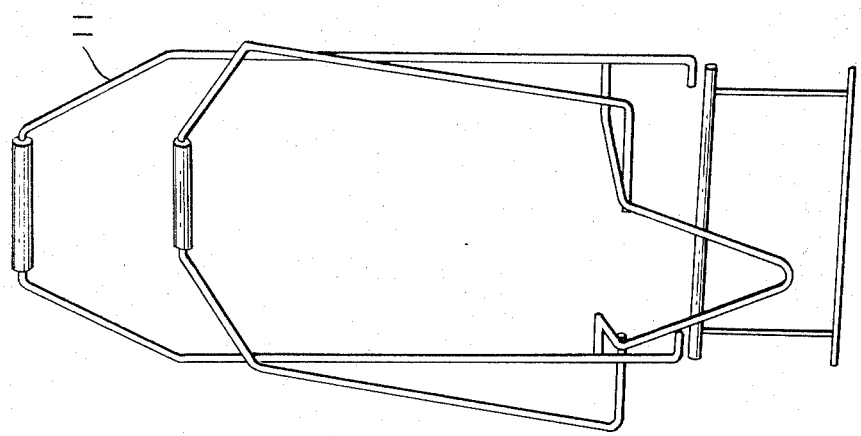
FIG. 3 shows the assembly of the guiding handle portion, the carrying cross-piece and side member portion, and the base portion forming the floor of the cart and the brake member thereof; and, in exploded and inverted position, the axle and retaining bars for attachment of the axle to the frame.

The reversal of the bag position as shown in FIG. 9 permits dual use of the carrying capabilities of the cart. Carton 26, shown in broken lines, exemplifies the hauling properties of the cart, while bag 23, suspended rearwardly from the guiding handle portion, is available for transporting small items.

The invention having been thus disclosed, what is claimed is:

1. A device of the nature of a portable push-cart providing in combination a frame having at least one pair of substantially parallel upright side members and at least one pair of substantially parallel upright back members, said side members and said back members being integrally connected at their lower ends to a cross member forming a base structure which provides an article support and includes an integral ground engaging support and braking member; and an axle extending between the lower extremities of the said back support members, with wheels mounted on said axle inwardly of said back support members; said back members at their uppermost ends being transversely and integrally connected to each other, and said side members at their uppermost ends likewise being transversely and integrally connected to each other.

2. The invention of claim 1 wherein said article support comprises transverse members disposed inwardly of said side and back members and integrally connected thereto, said article support being integrally extended to form a vertical terminus disposed, when the device is in upright position, in the same plane as the lowermost arc of the wheels, thus forming a brake to maintain the device in stationary position.

3. The invention of claim 1 wherein said transverse uppermost portions of said side members and said back members are provided with gripping means to facilitate guiding and lifting of said device.

4. The invention of claim 1 wherein said device is provided with a container resting upon said article support and retained in position upon said frame by detachable connection thereof to said side and back support members.

5. The invention of claim 1 wherein said container may be attached to said side and back members for suspension to the rear thereof, leaving said article support for the transportation of other articles disposed thereon.

6. The invention of claim 1 wherein said axle is provided with retention means inwardly of said wheels to maintain a fixed distance therebetween.

7. The invention of claim 1 wherein said structure, being formed of wire, is integrally connected by continuations of the lengths of said wire members and by welding at points of intersection thereof.

8. The invention of claim 1 wherein said structure, being formed of tubing, is integrally connected by continuations of the lengths thereof and by clamping means at points of intersection.

* * * * *